Patented Nov. 6, 1945

2,388,579

UNITED STATES PATENT OFFICE 2,388,579

PROCESS OF MAKING HETEROCYCLIC COMPOUNDS

Lee Irvin Smith, Minneapolis, Minn., and John A. King, Albany, N. Y., assignors to Regents of The University of Minnesota, Minneapolis, Minn., a corporation of Minnesota No Drawing. Application February 29, 1944, Serial No. 524,442

7 Claims. (Cl. 260—346)

The present invention relates to the preparation of 2-alkyl coumarans and more particularly to the preparation of 2-isopropyl-4,6,7-trimethyl-5-hydroxycoumaran. These compounds are somewhat similar to the tocopherols and tocopherol-like compounds, and have related physiological properties. The present invention involves a novel method of preparing compounds of this type.

It is, therefore, a general object of the present invention to provide a process of preparing 2-alkyl coumarans and a specific object to provide processes for preparing 2-isoalkyl coumarans. It is another object of the invention to provide a process of preparing compounds having physiological properties similar to the tocopherols.

Broadly, the invention involves the preparation of these compounds from trimethylquinone by the addition of an alkali metal enolate of a beta-diketone in accordance with the following series of reactions.

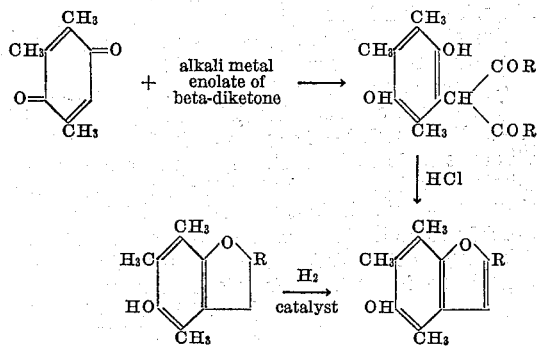

The enolate of the beta-diketone reacts with trimethylquinone to convert it to trimethylhydroquinone with the residue of the diketone attached to the 6 position of the ring. The action of hydrochloric acid on these hydroquinones is to convert them to the 2-alkyl coumarones, one acyl group being lost in the cyclization. Apparently, there is no control over which acyl group will cyclicize at least when the respective R groups are similar in characteristics. For this reason it is necessary to employ an alkyl diketone which is symmetrical, in order that only a simple gamma-alkyl coumarone be obtained. A 1,3-diketone containing various alkyl groups may be employed, depending on the type of product ultimately desired.

The following example will serve to illustrate the invention and it is to be understood that the example is not limiting in any sense but various modifications are possible without departing from the spirit of the invention.

Example

The beta-diketone, diisobutyrylmethane, was prepared as follows:

105 g. (4.58 moles) of powdered sodium were added with stirring to 985 g. (8.5 moles) of ethyl isobutyrate having a boiling point of 99–101° at 740 mm. pressure. An exothermic reaction occurred and the sodium was displaced by a slightly yellow solid. 86 g. (1.0 mole) of methyl isopropyl ketone having a boiling point of 92–94° C. at 740 mm. were added over a period of one hour to the well stirred suspension, and the mixture was stirred for three hours longer. It was then allowed to stand at room temperature overnight. The mixture was diluted with an equal volume of water and the layers were separated. The organic layer was extracted with three 400 cc. portions of water and the extracts were combined with the main aqueous solution. The combined aqueous solutions were extracted with three 400 cc. portions of ether (ether extracts discarded) and the aqueous solution was then acidified with 290 cc. of acetic acid. The upper organic layer was removed and added to a well-stirred solution of 200 g. of cupric acetate dissolved in 3 liters of water. The copper enolate was removed, suspended in ether and decomposed by shaking the suspension with dilute sulfuric acid. Removal of ether left 43.5 g. of orange-red oil, diisobutyrylmethane, (28% yield) which boiled at 62–63° C. at 3 mm. pressure.

16.85 g. (0.108 mole) of diisobutyrylmethane

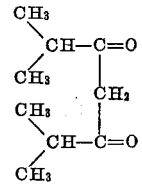

were slowly added to a cooled and stirred solution of 7.34 g. (0.108 mole) of sodium ethoxide dissolved in 50 cc. of dry alcohol. A solution of 16.0 g. (0.107 mole) of trimethylquinone dissolved in 50 cc. of dry alcohol were slowly added over a period of one hour with continued stirring and cooling below 25° C. The reaction mixture was stirred at room temperature for forty-five minutes after which it was cooled to about 0° C., carefully acidified with hydrochloric acid and poured into 800 cc. of water. The suspension of red solid was extracted with ether until the aqueous layer was colorless. The solvent was then removed under reduced pressure from the combined extracts. The residual red solid was recrystallized first from 250 cc. of petroleum ether of 60–68° C. boiling point and then from a benzene-petroleum ether mixture. The light tan solid weighted 25 g. (76% yield) and melted at 133–135° C. A specimen recrystallized from dilute methanol melted at 135–135.5° C.

11.4 g. of the above crystallized diketone of melting point 133–135° C. were refluxed for three hours with 250 cc. hydrochloric acid and 10 cc. of alcohol. The mixture was diluted with 500 cc. of water and subjected to distillation with superheated steam at 110° C. until no more solid appeared in the condensate. At this point 4.9 g. of unchanged diketone remained in the distillation residue. The white solid in the distillate was removed and crystallized twice from dilute alcohol. The resultant product 2-isopropyl-4,6,7-tri-methyl-5-hydroxycoumarone weighed 4 g. and melted at 118° C.

2.5 g. of this hydroxycoumarone dissolved in 50 cc. of alcohol were refluxed over 2 g. of Raney nickel for thirty minutes. The solution was then decanted into a small hydrogenation bomb, 2 g. of fresh catalyst were added and the mixture was subjected for one hour at 125° C. to the action of hydrogen under 1300 lbs. pressure. The cooled mixture was filtered and the filtrate was concentrated to a volume of 20 cc. and then diluted with water to incipient cloudiness and cooled. 2.4 g. of solid having a melting point of 105–107° were removed and crystallized twice from dilute alcohol and once from petroleum ether of boiling point 28–38° C. The product, 2-isopropyl-4,6,7-trimethyl-5-hydroxycoumaran then melted at 112° C.

It will be apparent that the above example is merely illustrative. The reactants and the reaction conditions may be varied within limits as is well understood in the art. For example, any dialkyl-beta-diketone may be used, the properties of the ultimate product depending, to some extent, on the nature of the diketone employed as a starting material.

What we claim is:

1. A process of preparing 2-alkyl coumarans which comprises reacting trimethylquinone with an alkali metal enolate of a symmetrical alkyl beta-diketone to form trimethylhydroquinone with the residue of the diketone attached to the 6 position of the ring, and cyclicizing said last named material to form a 2-alkyl coumarone, and reducing said coumarone to a coumaran.

2. A process of preparing 2-alkyl coumarans which comprises reacting trimethylquinone with an alkali metal enolate of a symmetrical alkyl beta-diketone to form trimethylhydroquinone with the residue of the diketone attached to the 6 position of the ring, reacting said last named material with hydrochloric acid to cyclicize said material to a 2-alkyl coumarone, and reducing said coumarone to a coumaran.

3. A process of preparing 2-isopropyl-4,6,7-trimethyl-5-hydroxycoumaran which comprises reacting an alkali metal enolate of diisobutyryl methane with trimethylquinone to form the trimethylhydroquinone with the diketone residue attached to the 6 position of the ring, cyclicizing said last named material to 2-isopropyl-4,6,7-trimethyl-5-hydroxycoumarone and reducing the hydroxycoumarone to the hydroxycoumaran.

4. A process of preparing a 2-alkyl coumaran which comprises reacting trimethylquinone with the sodium enolate of a symmetrical alkyl beta-diketone to form trimethylhydroquinone with the diketone residue attached to the 6 position on the ring, reacting said last named material with hydrochloric acid to cyclicize said material to a 2-alkyl coumarone, and catalytically hydrogenating said coumarone to a coumaran.

5. A process of preparing 2-isoalkyl coumarans which comprises reacting trimethylquinone with an alkali metal enolate of a symmetrical isoalkyl beta-diketone to form trimethyl hydroquinone with the residue of the diketone attached to the 6 position of the ring, and cyclicizing said last named material to form a 2-alkyl coumarone, and reducing said coumarone to a coumaran.

6. A process of preparing 2-isoalkyl coumarans which comprises reacting trimethylquinone with an alkali metal enolate of a symmetrical isoalkyl beta-diketone to form trimethylhydroquinone with the residue of the diketone attached to the 6 position of the ring, reacting said last named material with hydrochloric acid to cyclicize said material to a 2-isoalkyl coumarone, and reducing said coumarone to a coumaran.

7. A process of preparing a 2-isoalkyl coumaran which comprises reacting trimethylquinone with the sodium enolate of a symmetrical isoalkyl beta-diketone to form trimethylhydroquinone with the diketone residue attached to the 6 position on the ring, reacting said last named material with hydrochloric acid to cyclicize said material to a 2-isoalkyl coumarone, and catalytically hydrogenating said coumarone to a coumaran.

LEE IRVIN SMITH.
JOHN A. KING.